(12) United States Patent
Tsukamoto et al.

(10) Patent No.: US 7,369,381 B2
(45) Date of Patent: May 6, 2008

(54) WIRING HARNESS HOLDING DEVICE

(75) Inventors: Masashi Tsukamoto, Kosai (JP);
Kunihiko Sato, Kosai (JP); Masahiro Ito, Kosai (JP)

(73) Assignee: Yazaki Corporation, Tokyo (JP)

( * ) Notice: Subject to any disclaimer, the term of this patent is extended or adjusted under 35 U.S.C. 154(b) by 41 days.

(21) Appl. No.: 11/448,859

(22) Filed: Jun. 8, 2006

(65) Prior Publication Data

US 2006/0278424 A1   Dec. 14, 2006

(30) Foreign Application Priority Data

Jun. 8, 2005  (JP) ............................ P2005-168346
Jun. 8, 2005  (JP) ............................ P2005-168347
Feb. 8, 2006  (JP) ............................ P2006-031401

(51) Int. Cl.
*H02G 3/04* (2006.01)

(52) U.S. Cl. ................. 361/72 A; 361/70 R; 361/72 C

(58) Field of Classification Search ............... 174/68.1, 174/68.3, 72 A, 72 C, 70 R
See application file for complete search history.

(56) References Cited

U.S. PATENT DOCUMENTS 6,350,956 B1 *   2/2002   Sakata ..................... 174/101
7,060,903 B2 *   6/2006   Tsubaki .................... 174/72 A
7,207,833 B2 *   4/2007   Jeong ........................ 439/501
7,220,129 B1 *   5/2007   Nishijima et al. ............ 439/34
2002/0151213 A1 * 10/2002  Aoki et al. ................. 439/502
2007/0025061 A1 *  2/2007  Kogure et al. .............. 361/437

FOREIGN PATENT DOCUMENTS

| JP | 62-33627 U | 2/1987 |
| JP | 4-11751 U | 1/1992 |
| JP | 10-112922 A | 4/1998 |
| JP | 2000-211446 A | 8/2000 |
| JP | 2001151042 A * | 6/2001 |

* cited by examiner

*Primary Examiner*—Charles D. Garber
*Assistant Examiner*—David M Sinclair
(74) *Attorney, Agent, or Firm*—Sughrue Mion, PLLC

(57) ABSTRACT

A wiring harness holding device for holding a wiring harness laid between a stationary structure and a movable structure slidably provided to the stationary structure, includes a movable side holding portion that holds one portion of the wiring harness on the movable structure, and a stationary side holding portion that holds another portion of the wiring harness on the stationary structure. The movable side holding portion holds the wiring harness so that the wiring harness derived from the movable side holding portion towards the stationary side holding portion swivels around the movable side holding portion in association with the sliding movement of the movable structure.

17 Claims, 14 Drawing Sheets ated with sliding movement, the wiring harness ## WIRING HARNESS HOLDING DEVICE

BACKGROUND OF THE INVENTION

The present invention relates to a wiring harness holding device for a wiring harness which is laid out in such a manner as to extend between a stationary structure such as a vehicle body of a motor vehicle and a movable structure such as a sliding seat or sliding door which slides relative to the vehicle body and more particularly to a wiring harness holding device for absorbing an excess length of the wiring harness which is produced in association with the sliding of the movable structure.

Among automotive components, sliding seats and sliding doors are components which slide largely relative to the vehicle body. When attempting to install electric equipment at the sliding seat or sliding door, a wiring harness needs to be laid out in such a manner as to extend between the electric equipment and the vehicle body, and when this is actually carried out, there has been caused a difficulty in accommodating the wiring harness.

For example, since a sliding seat used on a currently popular minivan slides largely, an excess length is generated in a wiring harness 6 in association with the sliding movement of the sliding seat 5 as shown in FIG. 14, being likely to cause a problem that the occupant is caught at his or her leg by the wiring harness 6 which is loosened due to the excess length so produced.

To cope with this problem, there has been proposed a wiring harness holding device for enabling the extension and contraction of a wiring harness laid out between a sliding seat and a vehicle body according to the sliding movement of the sliding seat (for example, refer to JP-A-10-112922).

A wiring harness holding device disclosed in JP-A-10-112922 includes, as shown in FIG. 15, a protector 1 which is provided in parallel with a sliding direction of the sliding seat along a longitudinal direction thereof, a stationary side connector 2 which is provided at a front end of the protector 1 and a slider 3 which is brought into engagement and connection with the protector 1 and the sliding seat, respectively, in such a manner as to slide in the longitudinal direction of the protector 1.

A wiring harness 4 is accommodated within the protector 1 while being folded back substantially into a U-shape and is connected to the stationary side connector 2 at one end and to the slider 3 at the other end thereof. The wiring harness 4 extends and contracts within the protector 1 in association with the sliding of the slider 3 while moving the folded back portion back and forth along the sliding direction of the slider 3, whereby an excess length of the wiring harness 4 is absorbed which is produced in association with the sliding of the slider 3.

In the wiring harness holding device disclosed in JP-A-10-112922, the stationary side connector 2 and the slider 3 are aligned in the sliding direction of the slider 3, and the wiring harness 4 extending from the stationary side connector 2 is firstly allowed to so extend to the rear of the slider 3 and is then folded back in a substantially U-shaped fashion so as to be connected to the slider 3 from the rear thereof. In other words, for it to be caused to exit from the slider 3 towards the stationary side connector 2, the wiring harness 4 is firstly caused to extend to the rear of the slider 3.

Then, in order to avoid a damage at the folded back portion of the wiring harness 4 due to bending, an excess length L is secured at the rear of the slider 3 for keeping the radius of curvature at the folded back portion to a permissible value or greater in such a state that the wiring harness 4 is extended to its maximum length as shown in FIG. 16.

It appears that this causes a disadvantage in reducing the size of the wiring harness holding device. Namely, in a wiring harness of a large diameter such as one in which a general electric wire (an earth wire) needing a current capacity is provided in parallel, the permissible radius of curvature tends to be increased, and since the excess length L also needs to be set large in association with the increase in the radius of curvature, this construction tends to be a disadvantage in making the wiring harness holding device smaller in its size. In addition, the excess length is designed to meet the sliding stroke of the sliding seat and the radius of curvature of the wiring harness exclusively for each model, and this causes a problem that this wiring harness holding device is inferior with respect to general-purpose properties.

SUMMARY OF THE INVENTION

The invention was made in view of these situations, and an object thereof is to provide a wiring harness holding device for holding a wiring harness laid out in such a manner as to extend between a stationary structure and a movable structure which can absorb an excess length produced in association with the sliding movement of the movable structure and which is small in size and superior with respect to general-purpose properties.

With a view to accomplishing the object, according to respective aspects (1) to (15) of the invention, there will be provided a wiring harness holding device as below.

(1) According to a first aspect of the invention, there is provided a wiring harness holding device for holding a wiring harness laid between a stationary structure and a movable structure slidably provided to the stationary structure, comprising;

a movable side holding portion that holds one portion of the wiring harness on the movable structure; and a stationary side holding portion that holds another portion of the wiring harness on the stationary structure, wherein the movable side holding portion holds the wiring harness so that the wiring harness derived from the movable side holding portion towards the stationary side holding portion swivels around the movable side holding portion in association with the sliding movement of the movable structure.

(2) According to a second aspect of the invention, there is provided the wiring harness holding device as set forth in (1) above, wherein the movable side holding portion includes;

a protector which has a shaft portion and an arm portion extending in a direction intersecting an extending direction of the shaft portion, and which holds one end portion of the wiring harness; and a support member which is fixed to the movable structure and rotatably supports the shaft portion of the protector; and wherein the protector swivels so as to absorb an excess length of the wiring harness produced by the sliding movement of the movable structure.

(3) According to a third aspect of the invention, there is provided a wiring harness holding device as set forth in (2) above, wherein the wiring harness includes a main wiring harness and a sub-wiring harness;

wherein the protector includes a main protector adapted to hold the main wiring harness and a sub-protector adapted to hold the sub-wiring harness;

wherein the shaft portion and the arm portion are respectively divided into two parts which are provided on the main protector and the sub-protector respectively;

wherein the shaft portion of the main protector is rotatably supported on the support member; and wherein the sub-protector is assembled to the main protector while the shaft portion of the sub-protector is inserted into a shaft hole in the support member which rotatably supports the shaft portion of the main protector.

(4) According to a fourth aspect of the invention, there is provided a wiring harness holding device as set forth in (2) above, wherein the wiring harness derived from the shaft portion of the protector is fixed to the support member.

(5) According to a fifth aspect of the invention, there is provided a wiring harness holding device as set forth in (2) above, further comprising a biasing member that biases the protector in a predetermined rotational direction.

(6) According to a sixth aspect of the invention, there is provided a wiring harness holding device as set forth in (6) above, further comprising a restricting member that restricts a rotational angle of the shaft portion of the protector.

(7) According to a seventh aspect of the invention, there is provided a wiring harness holding device as set forth in (6) above, wherein the restricting member has ribs which are provided on the protector and the support member respectively so as to engage with each other.

(8) According to a eighth aspect of the invention, there is provided a wiring harness holding device as set forth in (2) above, further comprising a clamp that fixes the wiring harness to the stationary structure so that the wiring harness extends a direction perpendicular to the slide moving direction of the movable structure in the vicinity of the stationary side holding portion.

(9) According to a ninth aspect of the invention, there is provided a wiring harness holding device as set forth in (2) above, wherein the movable side holding portion is disposed so as to be spaced apart from the stationary side holding portion in a direction perpendicular to the slide moving direction of the movable structure.

(10) According to a tenth aspect of the invention, there is provided a wiring harness holding device as set forth in (1) above, wherein the movable side holding portion rotatably supports the wiring harness.

(11) According to a eleventh aspect of the invention, there is provided a wiring harness holding device as set forth in (10) above, wherein the movable side holding portion includes:

a fixing member which is fixed to the movable structure and which has a shaft hole and an exit hole communicating with the shaft hole, the exit hole having an opening part opening around an axis of the shaft hole by a predetermined degree; and a reinforcement member which holds the wiring harness which is passed through the shaft hole and the exit hole in the fixing member and is derived from the fixing member; and wherein the reinforcement member is supported at the opening portion of the exit hole so as to swivel about the axis of the shaft hole.

(12) According to a twelfth aspect of the invention, there is provided a wiring harness holding device as set forth in (11) above, wherein the reinforcement member is a corrugated tube having annular ridges and grooves alternately on an outer surface along a longitudinal direction thereof; and wherein a guide rail is formed at the opening portion of the exit hole and extends into an arc-like shape so as to engage with the ridges and grooves of the corrugated tube and to swivel about the axis of the shaft hole.

(13) According to a thirteenth aspect of the invention, there is provided a wiring harness holding device as set forth in (11) above, wherein the fixing member has a support part to which the wiring harness derived from the shaft hole in the fixing member is fixed.

(14) According to a fourteenth aspect of the invention, there is provided a wiring harness holding device as set forth in (11) above, further comprising a clamp that fixes the wiring harness to the stationary structure so that the wiring harness extends a direction perpendicular to the slide moving direction of the movable structure in the vicinity of the stationary side holding portion.

(15) According to a fifteenth aspect of the invention, there is provided a wiring harness holding device as set forth in (11) above, wherein the movable side holding portion is disposed so as to be spaced apart from the stationary side holding portion in a direction perpendicular to the slide moving direction of the movable structure.

According to the wiring harness holding device described in (1) above, an excess length produced in the wiring harness by virtue of the sliding movement of the movable structure due to the wiring harness caused to exit from the movable side holding portion towards the stationary side holding portion swiveling around the movable side holding portion in association with the sliding movement of the movable structure, whereby the wiring harness can be laid out without producing any looseness therein.

In addition, since the wiring harness swivels and the exiting direction of the wiring harness from the movable side holding portion is directed towards the stationary side holding portion in such a state that the wiring harness extends to its maximum length, the movable side holding portion and the stationary side holding portion can be linked together by the wiring harness which is shorter than that used in the conventional example, whereby the wiring harness holding device can be made smaller in size.

According to the wiring harness holding device described in (2) above, the wiring harness held by the arm portion of the protector extends in the direction which intersects the shaft portion of the protector without bending, and consequently, the wiring harness which is caused to exit from the arm portion of the protector swivels around the movable side holding portion in association with the rotation of the protector around the shaft portion. Then, the wiring harness which is caused to exit from the arm portion of the protector swivels around the movable side holding portion in association with the sliding of the movable side structure, whereby an excess length of the wiring harness produced by virtue of the sliding of the movable structure is absorbed. This allows the wiring harness to be laid out without any looseness.

In addition, since the swiveling of the wiring harness allows the wiring harness which is caused to exit from the movable side holding portion to be directed towards the stationary side holding portion in such a state that the wiring harness is extended to its maximum length, the movable side holding portion and the stationary side holding portion can be linked together by a shorter wiring harness, whereby the wiring harness holding device can be made smaller in size.

According to the wiring harness holding device described in (3) above, the protector, which is installed externally on the wiring harness to hold the same, is divided into the main protector and the sub-protector which each include the shaft portion and the arm portion, and the sub-protector is made to be assembled to the main protector which is rotatably supported by the support member at the shaft portion thereof. This facilitates the addition of the sub-wiring harness which makes up the different system from the main wiring harness held by the main protector in a subsequent step.

According to the wiring harness holding device described in (4) above, a twisting rotation is produced in the wiring harness held mainly by the shaft portion in association with the swiveling of the wiring harness which is caused to exit from the arm portion of the protector, whereby a stress applied to the wiring harness can be relaxed.

According to the wiring harness holding devices described in (5) and (7) above, an excessive rotation of the protector is prevented so as to restrict the production of looseness in the wiring harness.

According to the wiring harness holding device described in (8) above, the wiring harness is fixed in such a state that part of the wiring harness follows the direction which intersects the slide moving direction at right angles in the vicinity of the stationary side holding portion, whereby the behavior of the wiring harness is stabilized between the movable side holding portion and the stationary side holding portion which are disposed in such a manner as to be spaced apart in the direction which intersects the sliding direction of the movable structure at right angles, thereby making it possible to suppress the production of looseness in the wiring harness.

According to the wiring harness holding device described in (9) above, the wiring harness holding device can be applied to various types of movable structures having different sliding amounts by properly adjusting the distance over which the movable side holding portion and the stationary side holding portions are spaced apart in the direction which intersects the sliding direction at right angles within the scope of a capability of absorbing the excess length through the swiveling of the wiring harness, and therefore, is superior with respect to general-purpose properties.

According to the wiring harness holding device described in (10) above, the wiring harness which is caused to exit from the movable side holding portion towards the stationary side holding portion can swivel around the movable side holding portion.

According to the wiring harness holding device described in (11) above, the wiring harness is reinforced by the reinforcement member so that the wiring harness does not bend immediately after it is caused to exit from the exit hole, and the reinforcement member is supported at the opening of the exit hole in such a manner as to swivel about the axis of the shaft hole, whereby the wiring harness which is caused to exit from the exit hole towards the stationary side holding portion can swivel around the movable side holding portion.

According to the wiring harness holding device described in (12) above, since the reinforcement member is made up of the corrugated tube, the corrugated tube can not only be guided in the swiveling direction but also be prevented from being dislodged from the opening of the exit hole by the ridges and grooves formed on the outer surface of the corrugated tube and the guide rail formed at the opening of the exit hole.

According to the wiring harness holding device described in (13) above, a twisting rotation is produced mainly in the wiring harness accommodated in the shaft hole in association with the swiveling of the wiring harness which is caused to exit from the exit hole, whereby stress acting on the wiring harness can be relaxed.

According to the wiring harness holding device described in (14) above, the wiring harness is fixed in such a state that part of the wiring harness follows a direction which intersects the sliding direction at right angles in the vicinity of the stationary side holding portion, whereby the behavior of the wiring harness is stabilized between the movable side holding portion and the stationary side holding portion which are disposed in such a manner as to be spaced apart in the direction which intersects the sliding direction of the movable structure at right angles, thereby making it possible to suppress the production of looseness in the wiring harness.

According to the wiring harness holding device described in (15) above, the wiring harness holding device can be applied to various types of movable structures having different sliding amounts by properly adjusting the distance over which the movable side holding portion and the stationary side holding portion are spaced apart in the direction which intersects the sliding direction at right angles within the scope of a capability of absorbing the excess length through the swiveling of the wiring harness, and therefore, is superior with respect to general-purpose properties.

In the wiring harness holding device for holding a wiring harness laid out in such a manner as to extend between the stationary structure and the movable structure, the wiring harness holding device can be provided which can absorb the excess length produced in association with the sliding movement of the movable structure and which is small in size and superior with respect to the general-purpose properties.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Hereinafter, preferred embodiments will be described by reference to the accompanying drawings.

Figure 1:
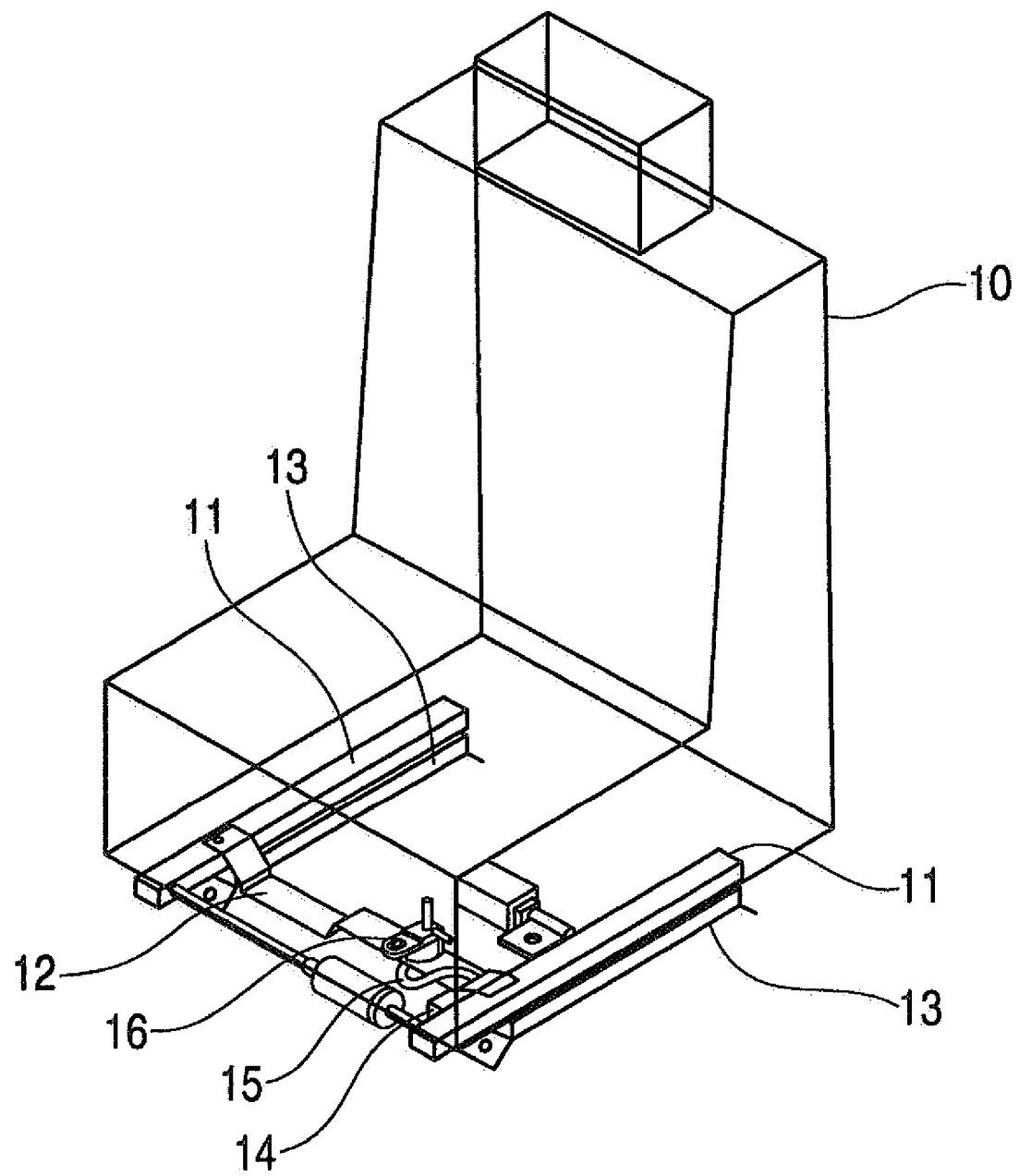
FIG. 1 is a perspective view of a vehicle sliding seat to which a wiring harness holding device of a first embodiment of the invention is applied.
Figure 2:
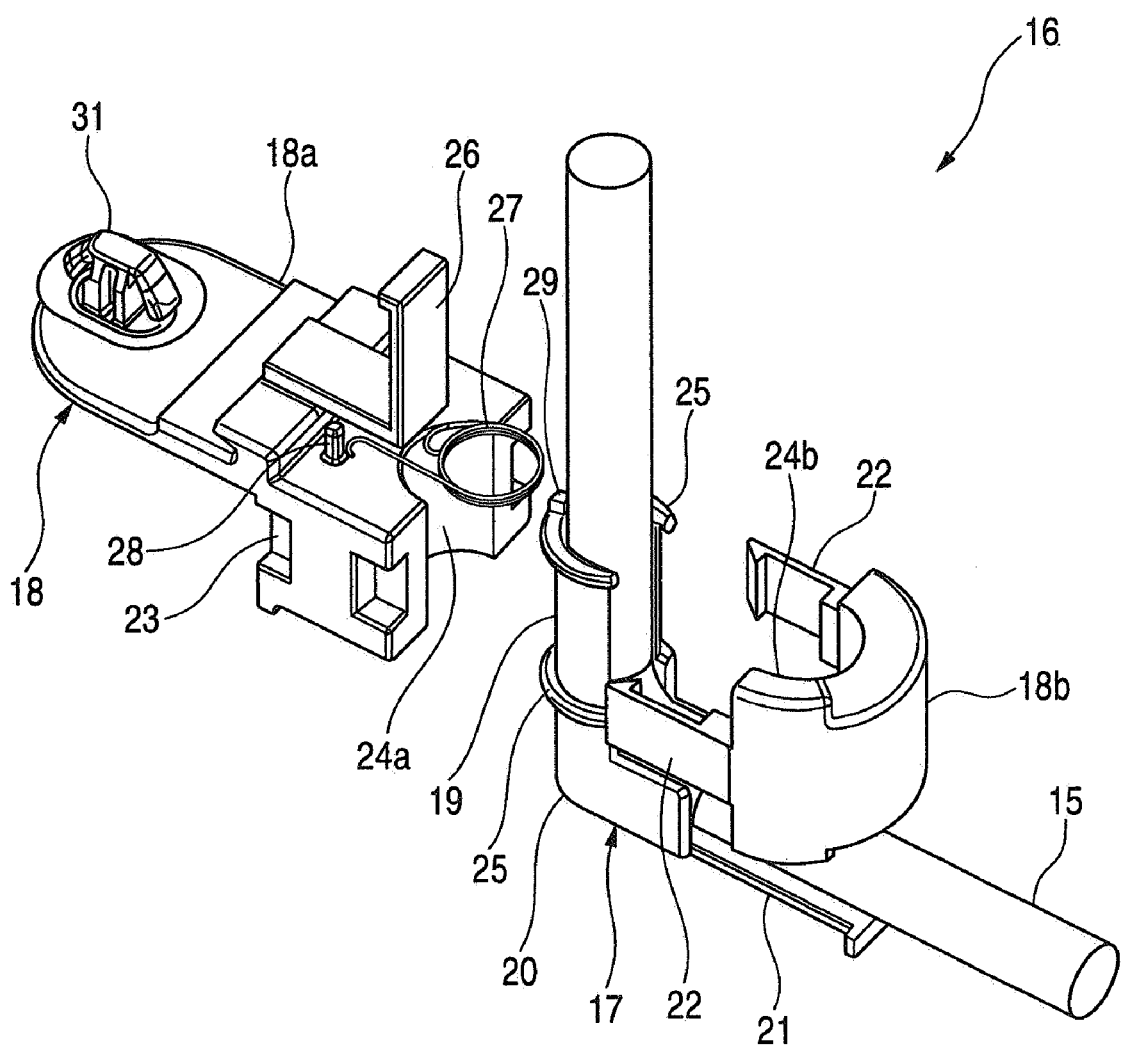
FIG. 2 is an exploded perspective view of a movable side holding portion of the wiring harness holding device shown in FIG. 1.
Figure 3:
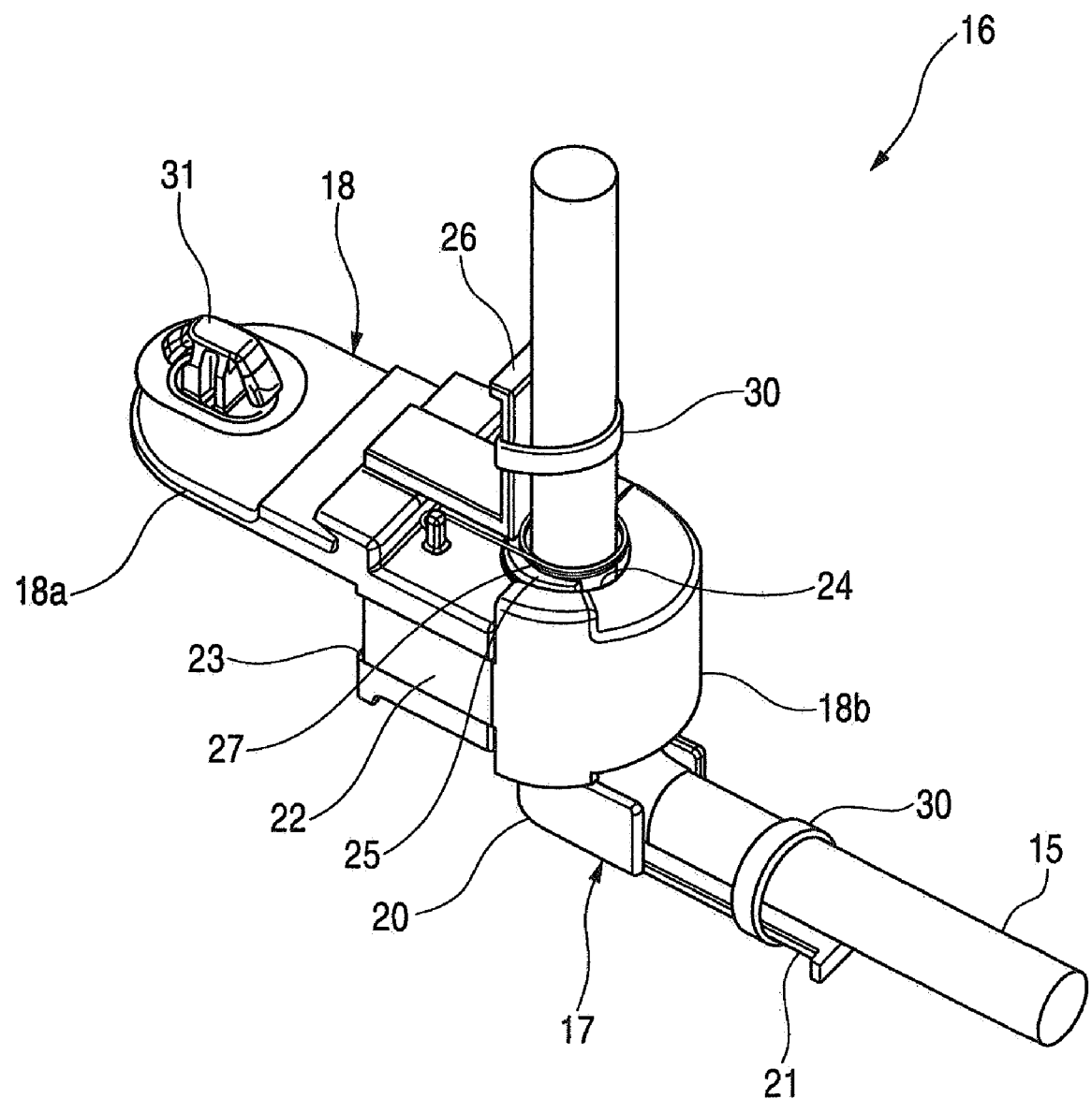
FIG. 3 is a perspective view showing an external appearance of the movable side holding portion shown in FIG. 2 which has been assembled completely.

FIG. 1 is a perspective view of a vehicle sliding seat to which a wiring harness holding device of a first embodiment of the invention is applied, FIG. 2 is an exploded perspective view of a movable side holding portion of the wiring harness holding device shown in FIG. 1, FIG. 3 is a perspective view showing an external appearance of the movable side holding portion which has been assembled completely, and FIG. 4 shows plan views of the vehicle sliding seat as viewed from a bottom side thereof which explain the operation of the wiring harness holding device shown in FIG. 1.

Firstly, a sliding construction of a vehicle sliding seat will be described.

As shown in FIG. 1, a pair of sliders 11 which extend in a back and forth or longitudinal direction of a vehicle body (not shown) are mounted on a bottom side of a vehicle sliding seat (a movable structure) 10 in such a manner as to be spaced apart in a width direction of the seat 10, and front end portions of the individual sliders 11 are connected to each other by a connecting bar 12 which is extended between the pair of sliders 11.

In addition, a pair of guide rails 13 are provided to extend on a floor of the vehicle body in the longitudinal direction of the vehicle body in such a manner as to correspond to the pair of sliders 11, respectively. Each slider 11 travels along the corresponding guide rail 13, so as to allow the seat 10 to slide in the longitudinal direction of the vehicle body.

Additionally, a wiring harness 15 is laid out in such a manner as to extend between the vehicle body and the seat 10, and the wiring harness holding device of this embodiment includes a movable side holding portion 16 which holds the wiring harness 15 on the seat 10 and a stationary side holding portion which holds the wiring harness on the vehicle body.

The stationary side holding portion is a floor-bound connector 14 mounted on an inside of a front end portion of one of the guide rails 13, and the wiring harness 15 is connected to the floor-bound connector 14 at one end thereof. In addition, the movable side holding portion 16 is mounted on the connecting bar 12 and holds one portion of the wiring harness 15.

As shown in FIGS. 2 and 3, the movable side holding portion 16 includes a protector 17 and a support member 18, which are both made from synthetic resin.

The protector 17 has a substantially circular cylindrical shaft portion 19 which is partially cut away in a circumferential direction thereof and a batten-shaped arm portion 21 which continues to a lower end portion of the shaft portion 19 via a bent portion 20 and extends in a direction which intersects the shaft portion 19 substantially at right angles and is installed externally on the wiring harness 15 so as to hold the same in a bent fashion. Note that while the protector 17 is strongly fixed to the wiring harness 15 by being bundled together with the wiring harness 15 by means of a bundling member 30 such as an adhesive tape or the like at the arm portion 21, at the shaft portion 19, the protector 17 grabs the wiring harness 15 to such an extent that the wiring harness 15 can be rotated in a twisted fashion in an interior of the shaft portion 19.

The support member 18 is divided into two parts; a main body 18a and a divided body 18b. The divided body 18b has a pair of locking claws 22 provided on both sides thereof and is detachably assembled to the main body 18a by bringing the pair of locking claws 22 into engagement with a pair of locking grooves 23 provided on the main body 18a, respectively. Joining surfaces of the main body 18a and the divided body 18b are recessed to form grooves 24a, 24b each having a semi-circular cross section, respectively, in such a manner as to extend vertically, and a through hole (a shaft hole) 24 is defined by the grooves 24a, 24b which vertically passes through the support member 18 in such a state that the divided body 18b is assembled to the main body 18a.

The shaft portion 19 of the protector 17 is accommodated within the through hole 24 with its axis arranged to extend vertically. The through hole 24 in the support member 18 is formed slightly larger in diameter than the shaft portion 19 of the protector 17, so that the shaft portion 19 accommodated within the through hole 24 can be rotated within the through hole 24. When the protector 17 rotates on the shaft portion 19, the arm portion 21 of the protector 17 swivels on the shaft portion 19, whereby the wiring harness 15 held on to the arm portion 21 or caused to exit from the arm portion 21 swivels on the shaft portion 19. Flange or collar portions 25 are provided at upper and lower end portions of the shaft portion 19 of the protector 17 in such a manner as to be brought into engagement with upper and lower opening edge portions of the through hole 24 in the support member 18 so as to prevent the dislodgement of the shaft portion 19 from the through hole 24.

A support piece 26 is provided on the support member 18 at a position adjacent to the upper opening edge portion of the through hole 24 in such a manner as to erect therefrom. The wiring harness 15 caused to exit from the shaft portion 19 of the protector 17 is strongly fixed to the support piece 26 by being bundled by means of a bundling member 30 such as an adhesive tape or the like. Due to this, a twisting rotation is produced mainly in a portion of the wiring harness 15 which is grabbed by the shaft portion 19 of the wiring harness 15 in association with the swiveling of the wiring harness 15 which is held by the arm portion and is caused to exit from the arm portion 21.

In addition, a spiral spring 27 is mounted on the movable side holding portion 16 in such a manner that with one end fastened to a projection 28 provided on the support member 18 in a hooked fashion, the spiral spring 27 extends to turn around an outer circumference of a distal end portion of the wiring harness 15 which is caused to exit from the shaft portion 19 of the protector 17 and is eventually fastened to a projection 29 provided on the shaft portion 19 of the protector 17 in a hooked fashion at the other end thereof. The spiral spring 27 biases the protector 17 in a predetermined rotational direction A.

The movable side holding portion 16, which is configured as has been described above, is mounted on the connecting bar 12 by bringing a hook 31 provided on the support member 18 into engagement with a locking hole 32 (refer to FIG. 4) provided in the connecting bar 12. Note that as shown in FIG. 4, a plurality of locking holes 32 are provided at predetermined intervals in a longitudinal direction of the connecting bar 12, so that a spacing distance between the floor-bound connector 14 and the movable side holding portion 16 can be adjusted along the width direction of the seat 10 or a direction which intersects a sliding direction of the seat 10 at right angles (note that while in this embodiment, the direction is described as being the width direction of the seat 10 which is horizontal relative to the floor, the direction intersecting the sliding direction at right angles includes directions horizontal and vertical relative to the floor, as well as a resultant thereof) by bringing the hook 31 into engagement with a proper one of the locking holes 32. In addition, the wiring harness 15 is connected to the floor-bound connector 14 at an end portion thereof which lies to an end of the wiring harness 15 which is caused to exit from the arm portion 21 of the protector 17.

Next, referring to FIGS. 4A to 4D, the operation of the wiring harness holding device, which has been described heretofore, will be described below. FIGS. 4A to 4D show how the seat 10 slides forwards.

Figure 4A:
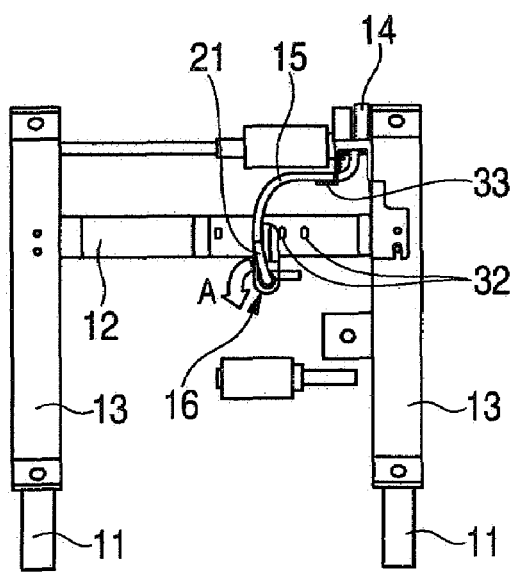
FIGS. 4A to 4D are plan views of the vehicle sliding seat as viewed from a bottom side thereof which explain the operation of the wiring harness holding device shown in FIG. 1.

In an initial state shown in FIG. 4A, the floor-bound connector 14 is situated in front of the movable side holding portion 16 while being spaced apart therefrom in the width direction of the seat 10. The arm portion 21 of the protector 17 extends substantially forwards.

Figure 4B:
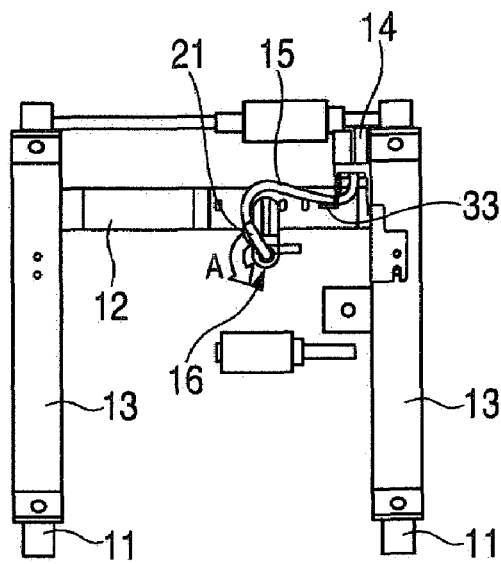

The floor-bound connector 14 and the movable side holding portion 16 approach each other when the seat 10 slides forwards from the state shown in FIG. 4A to a state shown in FIG. 4B. Due to this, an excess length is produced in the wiring harness 15, whereby the wiring harness 15 is bent. Due to the rigidity (the restoring force) of the wiring harness 15, however, a torque is applied to the protector 17, whereby the protector 17 rotates. In addition, the wiring harness 15 is swiveled by the arm portion 21 of the protector 17 in association with the rotation of the protector 17, whereby the direction in which the wiring harness 15 is caused to exit from the arm portion 21 changes around the shaft portion 19 of the protector, the excess length of the wiring harness 15 being thereby absorbed.

Here, in the event that the restoring force of the wiring harness 15 acts on the arm portion 21 in parallel with the extending direction of the arm portion 21 of the protector 17, no torque acts on the protector 17, and hence, the rotation of the protector 17 is not induced. Consequently, in this embodiment, the protector 17 is biased in the predetermined rotational direction (a direction indicated by an arrow A in the figure, that is, a rotational direction in which a distal end of the arm portion 21 is spaced apart from the floor-bound connector 14 in the width direction of the seat 10) by the spiral spring 27 mounted on the movable side holding portion 16, whereby the behavior of the protector 17 is stabilized, and hence, the behavior of the wiring harness 15 is stabilized. Note that in order to increase the restoring force of the wiring harness 15, a corrugated tube or the like may be installed externally on the wiring harness 15.

Figure 4C:
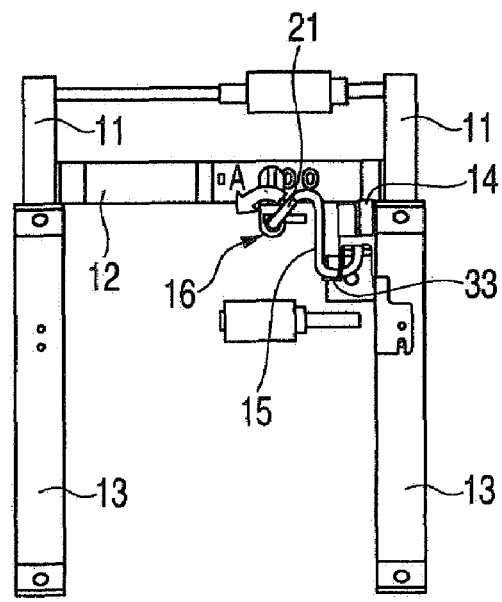
Figure 4D:
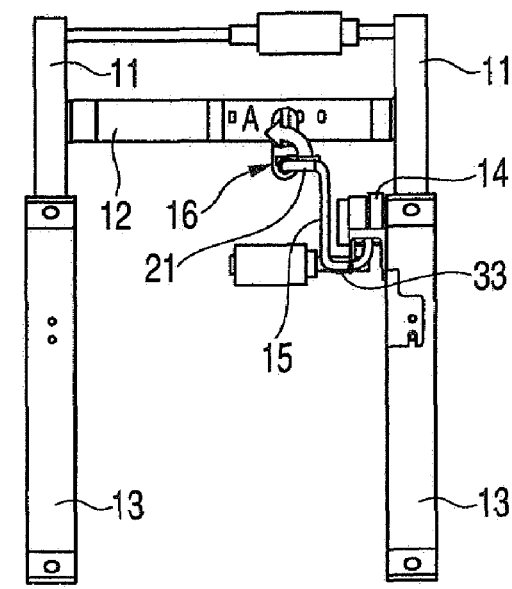

Then, when the seat 10 slides forwards from the state shown in FIG. 4B to states shown in FIGS. 4C, 4D, the floor-bound connector 14 is spaced apart from the movable side holding portion 16. Then, being pulled by the wiring harness 15, the protector 17 rotates in such a manner that the distal end of the arm portion 21 is directed towards the floor-bound connector 14. Due to the protector 17 rotating so that the distal end of the arm portion 21 of the protector 17 is directed towards the floor-bound connector 14 in such a state that the wiring harness 15 is extended to its maximum length as shown in FIG. 4D, the movable side holding portion 16 and the floor-bound connector 14 can be linked together by the wiring harness 15, which is shorter than that used in the conventional example, whereby the reduction in size of the wiring harness holding device is realized.

As this occurs, the spiral spring 27 biases the protector 17 in the opposite direction (the direction indicated by the arrow A in the figure) to the rotational direction of the protector 17, whereby an excessive rotation of the protector 17 is prevented, so as to suppress the generation of a looseness in the wiring harness 15.

In addition, the twisting rotation is produced mainly in the portion of the wiring harness 15 which is grabbed by the shaft portion 19 of the protector 17 as the protector 17 rotates, whereby the stress applied to the wiring harness 15 is relaxed.

Additionally, the wiring harness 15 is fixed to the vehicle body by a clamp 33 in such a manner as to follow along the width direction of the seat 10 in the vicinity of the floor-bound connector 14, whereby the behavior of the wiring harness 15 is stabilized and the generation of looseness is restricted.

Furthermore, the protector 17 and the support member 18 which make up the movable side holding portion 16 are both made from synthetic resin, providing for superior recycling properties. In addition, the divided body 18b is detachably assembled to the main body 18a of the support member 18, providing for superior operability at the time of disassembly.

Next, referring to FIG. 5, a second embodiment of the invention will be described below.

Figure 5:
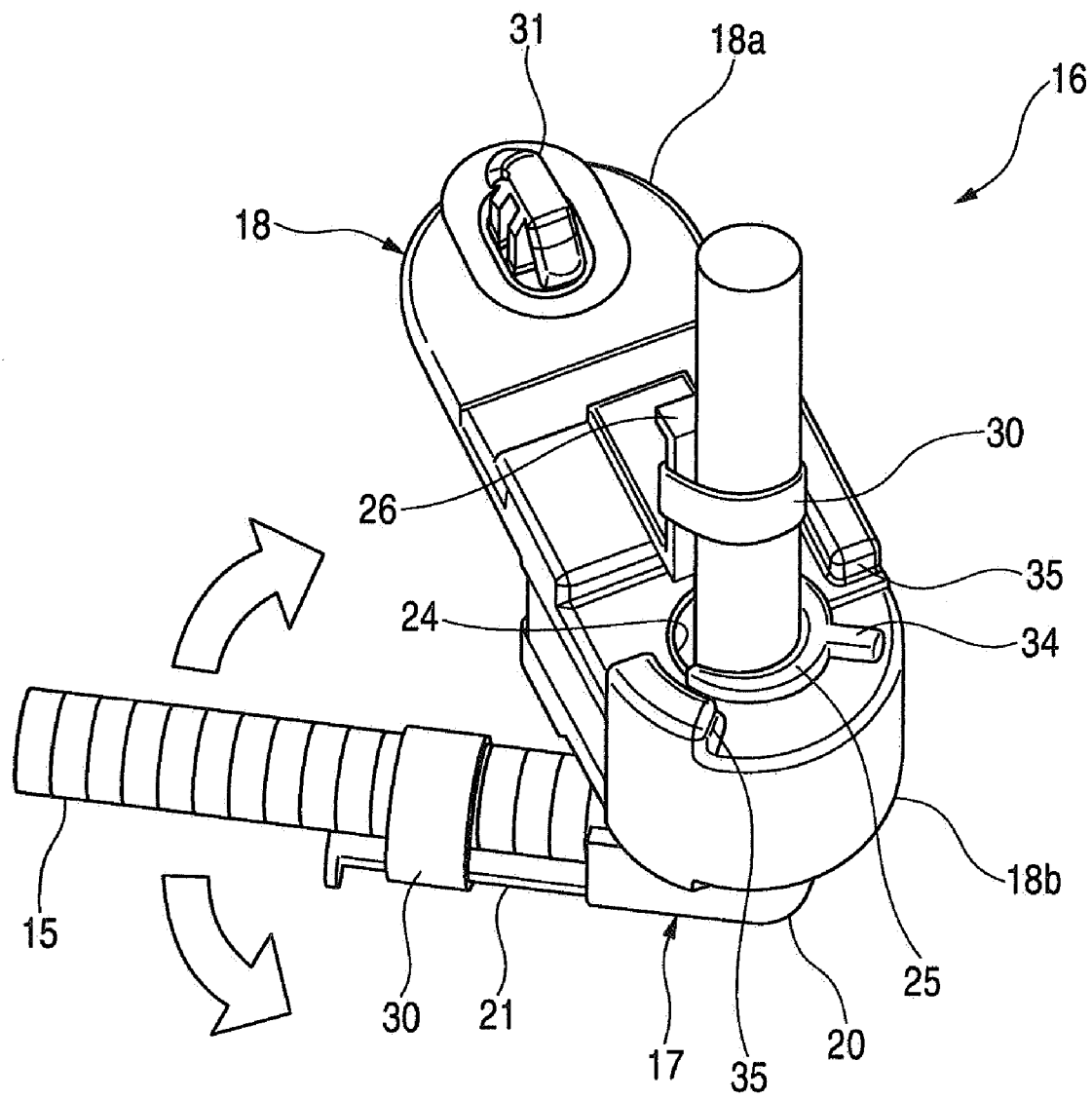
FIG. 5 is a perspective view of a movable side holding portion of a wiring harness holding device according to a second embodiment of the invention.

FIG. 5 is a perspective view of a movable side holding portion of a wiring harness holding device according to a second embodiment of the invention. Note that like reference numerals will be imparted to like or corresponding members to those of the first embodiment that has been described above, so as to omit the description thereof.

As shown in FIG. 5, the wiring harness holding device of the second embodiment is such that in the movable side holding portion 16 of the wiring harness holding device of the first embodiment that has been described above, a restriction rib 34 is provided at an upper collar portion 25 of a shaft portion 19 of a protector 17 in such a manner as to protrude radially, and a restriction rib 35 is provided at an upper opening edge portion of a through hole 24 of a support member 18 with which the collar portion 25 is in engagement in such a manner as to be situated on the same circumference as where the restriction rib 34 is situated, whereby the rotational angle of the protector 17 is restricted, so that the protector 17 is restricted from rotating excessively so as to suppress the production of a looseness in the wiring harness 15. The other configuration and the function and advantage of the second embodiment are the same as those of the first embodiment that has been described before.

Next, referring to FIGS. 6 to 11, a third embodiment of the invention will be described below.

Figure 6:
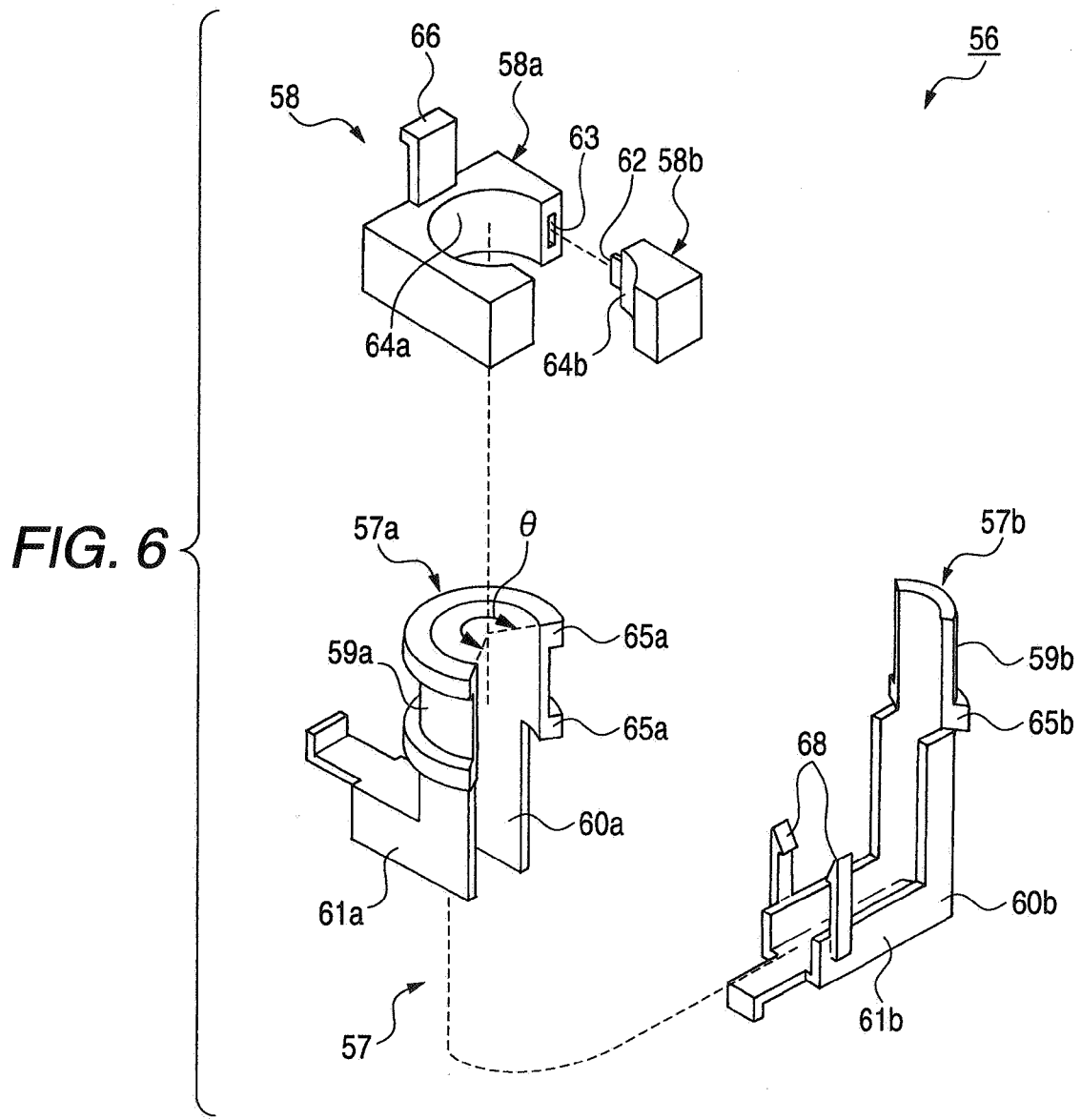
FIG. 6 is an exploded perspective view of a movable side holding portion of a wiring harness holding device of a third embodiment of the invention.
Figure 7:
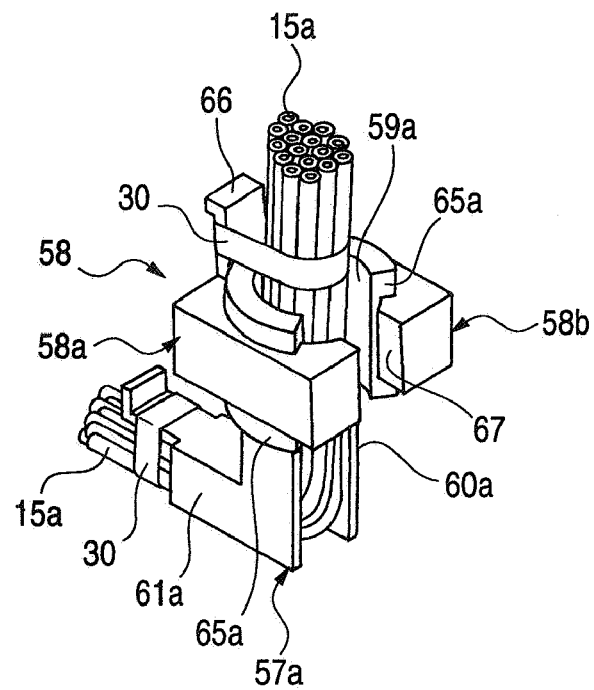
FIG. 7 is a perspective view showing an external appearance of part of the movable side holding portion shown in FIG. 6 which explains an assembling procedure thereof.
Figure 8:
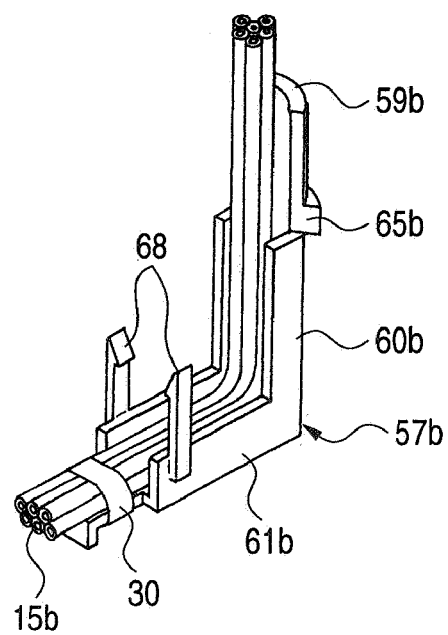
FIG. 8 is a perspective view showing an external appearance of part of the movable side holding portion shown in FIG. 6 which explains the assembling procedure thereof.
Figure 9:
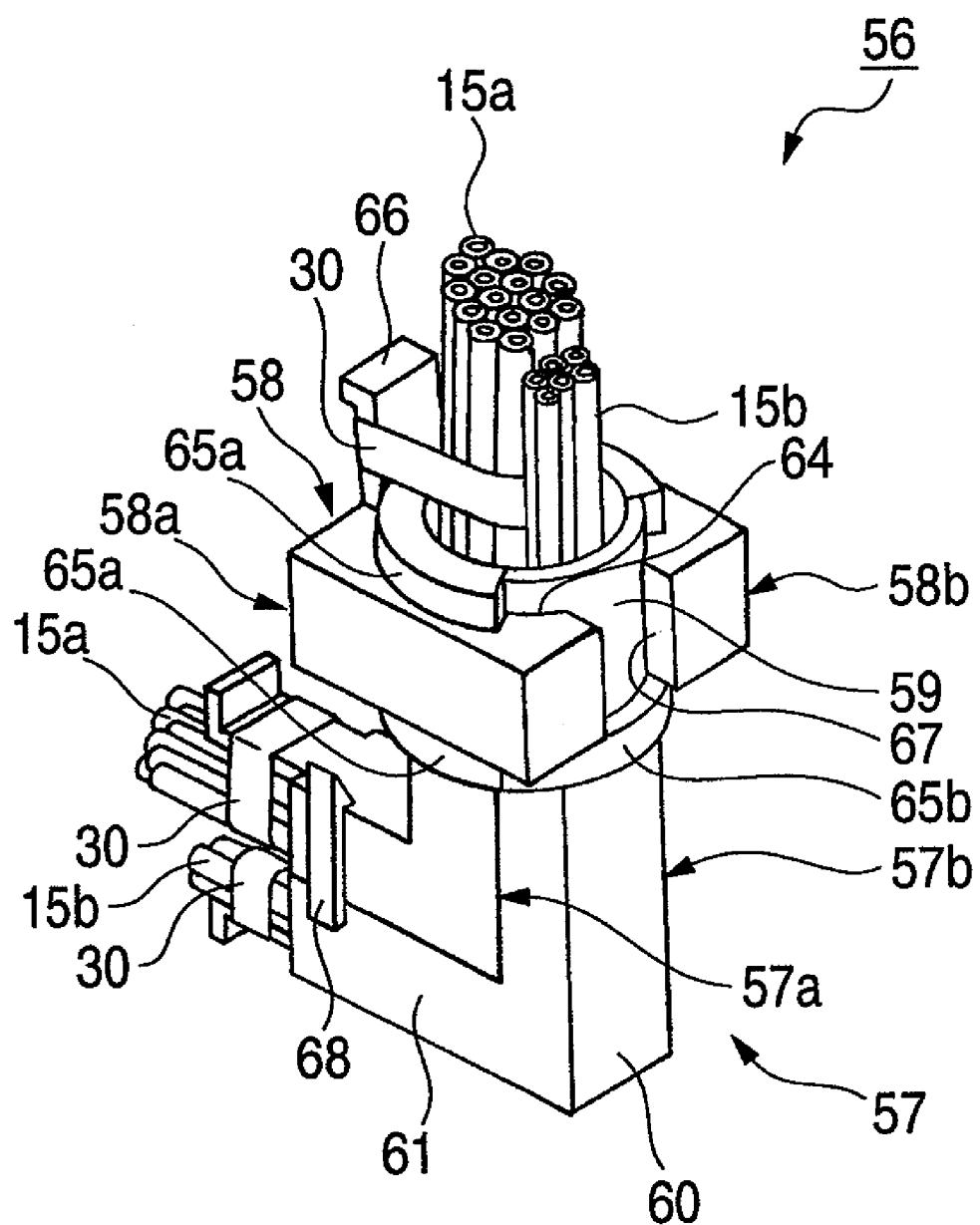
FIG. 9 is a perspective view showing an external view of the movable side holding portion shown in FIG. 6 which has been assembled completely.

FIG. 6 is an exploded perspective view of a movable side holding portion of a wiring harness holding device of a third embodiment of the invention, FIG. 7 is a perspective view showing an external appearance of part of the movable side holding portion shown in FIG. 6 which explains an assembling procedure thereof, FIG. 8 is a perspective view showing an external view of the remaining part of the movable side holding portion shown in FIG. 6 which explains an assembling procedure thereof, and FIG. 9 is a perspective view showing an external view of the movable side holding portion shown in FIG. 6 which has been assembled completely. Note that like reference numerals will be imparted to like members to those of the first embodiment that has been described before, so as to omit the description thereof.

In a wiring harness holding device of this embodiment, a movable side holding portion 56 shown in FIG. 9 is provided in place of the movable side holding portion 16 of the wiring harness holding device of the first embodiment that has been described before. The movable side holding portion 56 includes a protector 57 and a support member 58, which are both formed from synthetic resin.

Referring to FIG. 6 further, the protector 57 has a circular cylindrical shaft portion 59 and an angular cylindrical arm portion 61 which continues to a lower end portion of the shaft portion 59 via an angular cylindrical bent portion 60 and extends in a direction which intersects the shaft portion 59 substantially at right angles and is formed substantially into an L-shape as a whole. This protector 57 is divided into two parts; a main protector 57a which makes up an inner edge side of the L-shape, a sub-protector 57b which makes up an outer edge side thereof.

The main protector 57a includes a main shaft portion 59a which is divided from the shaft portion 59 at a central angle ea 180° and inner edge parts 60a, 61a of the bent portion 60 and the arm portion 61 which each have a U-shaped cross section, and the sub-protector 57b includes a sub-shaft portion 59b resulting when the main shaft portion 59a is taken away from the shaft portion 59 and outer edge parts 60b, 61b of the bent portion 60 and the arm portion 61 which each have a U-shaped cross section. A set of locking claws 68 are provided on the arm-portion outer edge part 61b of the sub-protector 57b, so that the sub-protector 57b is assembled on to the main protector 57a by bringing these locking claws 68 into engagement with the arm-portion inner edge part 61a of the main protector 57a.

The main protector 57a is installed externally on a main wiring harness 15a to hold the same while bending it substantially into an L-shape, while the sub-protector 57b is installed externally on a sub-wiring harness 15b which makes up a different system from the main wiring harness 15a to hold the same while bending it substantially into an L-shape. A support piece is provided at a protruding end of the arm-portion inner edge part 61a of the main protector 57a in such a manner as to protrude therefrom, and the main wiring 15a is strongly fixed to the support piece by, for example, being bundled thereto by means of a bundling member 30 such as an adhesive tape or the like. Similarly, a support piece is also provided at a protruding end of the arm-portion outer edge part 61b of the sub-protector 57b in such a manner as to protrude therefrom, and the sub-wiring harness 15b is fixed to the support piece by, for example, being bundled to thereto by means of a bundling member 30 such an adhesive tape or the like.

The support member 58 has a shaft hole 64 which accommodates therein the shaft portion 59 of the protector 57 to rotatably support the same, and a slit 67 is provided in a circumferential wall which defines the shaft hole 64 in such a manner as to divide the circumferential wall in a circumferential direction. This support member 58 is made up of a divided body 58b which is made by dividing the circumferential wall which defines the shaft hole 64 at the slit 67 and another circumferential location on the circumferential wall and a main body 58a which is made up of the remaining circumferential wall which excludes the divided body 58b. A locking piece 62 is provided on a dividing surface of the divided body 58b in such a manner as to protrude therefrom, so that the divided body 58b is assembled to the main body 58b by causing the locking piece 62 to fit into a locking groove 63 which is provided on a dividing surface of the main body 58a by recessing a corresponding portion on the dividing surface. Note that in FIG. 6, reference numerals 64a, 64b denote arc grooves, respectively, which are formed by recessing corresponding portions of the main body 58a and the divided body 58b individually in such a manner as to define the shaft hole 64a when both the main body 58a and the divided body 58b are assembled together.

The shaft hole in the support member 58 is formed slightly larger in diameter than the shaft portion 59 of the protector 57, so that the shaft portion 59 can rotate in the shaft hole 64 when accommodated therein. When the protector 57 rotates on the shaft portion 59, the arm portion 61 of the protector 57 swivels on the shaft portion 59, whereby the main wiring harness 15a and the sub-wiring harness 15b which are caused to exit from the arm portion 61 also swivel together on the shaft portion 59.

A main shaft portion 59a of the main protector 57a has flange or collar portions 65a at upper and lower end portions thereof which are provided in such a manner as to be brought into engagement with opening edge portions of the shaft hole 64 of the support member 58, respectively so as to prevent the dislodgement of the main shaft portion 59a from the shaft hole 64, and a sub-shaft portion 59b, which is included in the sub-protector 57b, has a collar portion 65b which is provided only at a lower end portion in such a manner as to be brought into engagement with the lower opening edge portion of the shaft hole 64.

Referring to FIGS. 7 to 9, an assembling procedure of the movable side holding portion 56 that is configured as has been described heretofore will be described.

Firstly, as shown in FIG. 7, the main protector 57a of the protector 57 is installed externally on the main wiring harness 15a to hold the same while bending it substantially into the L-shape. Then, the main shaft portion 59a of the main protector 57a is disposed within the arc groove 64a of the main body 58a of the support member 58, so as to assemble the divided body 58b on to the main body 58a. Here, the center angle θ off the main shaft portion 59a of the main protector 57a is 180° or greater, and the collar portions 65a provided at the upper and lower end portions of the main shaft portion 59a are in engagement with the upper end lower opening edge portions of the shaft hole 64 in the support member 58, respectively, and therefore, the dislodgement of the main shaft portion 59a from the shaft hole 64 is prevented.

In addition, a support piece 66 is provided on the support member 58 at a position lying adjacent to the upper opening edge of the shaft hole 64 in such a manner as to erect therefrom, and the main wiring harness 15a which is caused to exit from the main shaft portion 59a of the main protector 57 is fixed to the support piece 66 by, for example, being bundled by means of a bundling member 30 such as an adhesive tape or the like. Due to this, a twisting rotation is produced in a portion of the main wiring harness 15a which is disposed in the main shaft portion 59a in association with the swiveling of the main wiring harness 15a which is caused to exit from the arm portion 61.

Following this, as shown in FIG. 8, the sub-protector 57b of the protector 57 is installed externally on the sub-wiring harness 15b to hold the same while bending it substantially into the L-shape. Then, as shown in FIG. 9, the sub-wiring harness 15b which is caused to exit from the sub-shaft portion 59b of the sub-protector 57b is passed through the slit 67 in the support member 58 so as to be disposed within the shaft hole 64, and thereafter, the locking claws 68 are brought into engagement with the arm-portion inner edge part 61a off the main protector 57a while the sub-shaft portion 59b is inserted into the shaft hole 64 from a lower side of the support member 58, whereby the sub-protector 57b is assembled on to the main protector 57a. Note that the sub-wiring harness 15b may also be fixed to the support piece 66 at the same time.

Thus, the sub-wiring harness 15b, which makes up the different system from the main wiring harness 15a which is held by the main protector 57a, can easily be added by being held by the sub-protector 57b at the subsequent step. Consequently, for example, a wiring harness which is common over different models or different grades of the same model is made to be the main wiring harness 15a, and the main wiring harness is assembled in advance to the support member 58 using the main protector 57a. Then, on an assembly line, a wiring harnesses which makes up different system such as a seat adjusting circuit, a seat belt circuit, an airbag circuit or the like can be added as the sub-wiring harness 15b at the subsequent step depending on models or grades, thereby making it possible to expand the general-purpose properties of the wiring harness holding device. The other configuration and the function and advantage of the third embodiment are similar to those of the first embodiment that has been described before.

While, in the first embodiment, the support piece 26 is described as being provided on the support member 18 in such a manner as to extend along the axial direction of the through hole 24, the invention is not limited thereto, and the support piece 26 may be provided on the support member 18 in such a manner as to extend along a direction which intersects the axial direction of the through hole 24 at right angles so as to fix to the support piece 26 the wiring harness 15 which is caused to exit from the shaft portion 19 of the protector 17.

Next, referring to FIGS. 10 to 13, a fourth embodiment of the invention will be described below.

Figure 10:
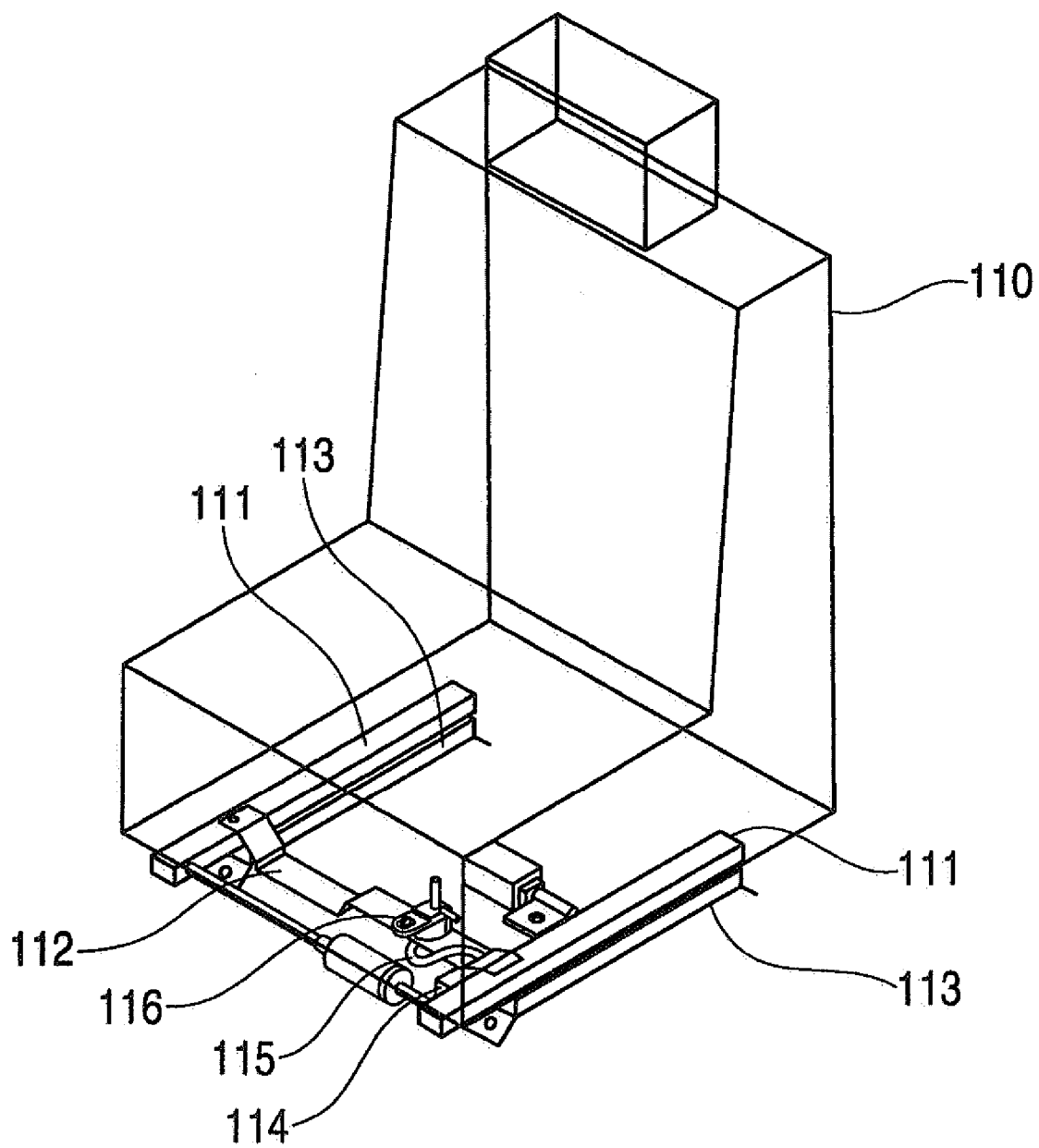
FIG. 10 is a perspective view of a vehicle sliding seat to which a wiring harness holding device of a first embodiment of the invention is applied.
Figure 11:
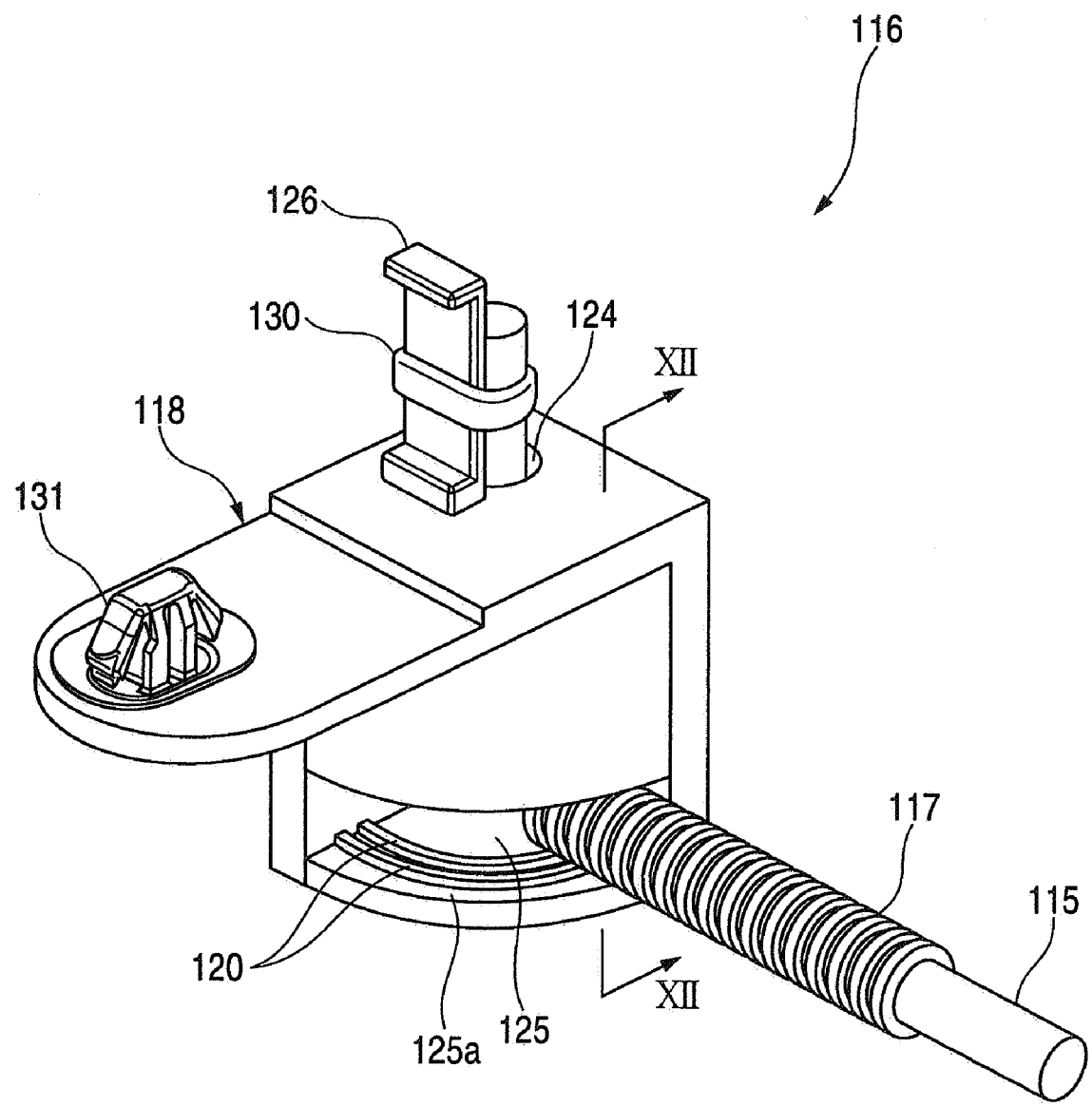
FIG. 11 is an exploded perspective view of a main part of the wiring harness holding device shown in FIG. 10.
Figure 12:
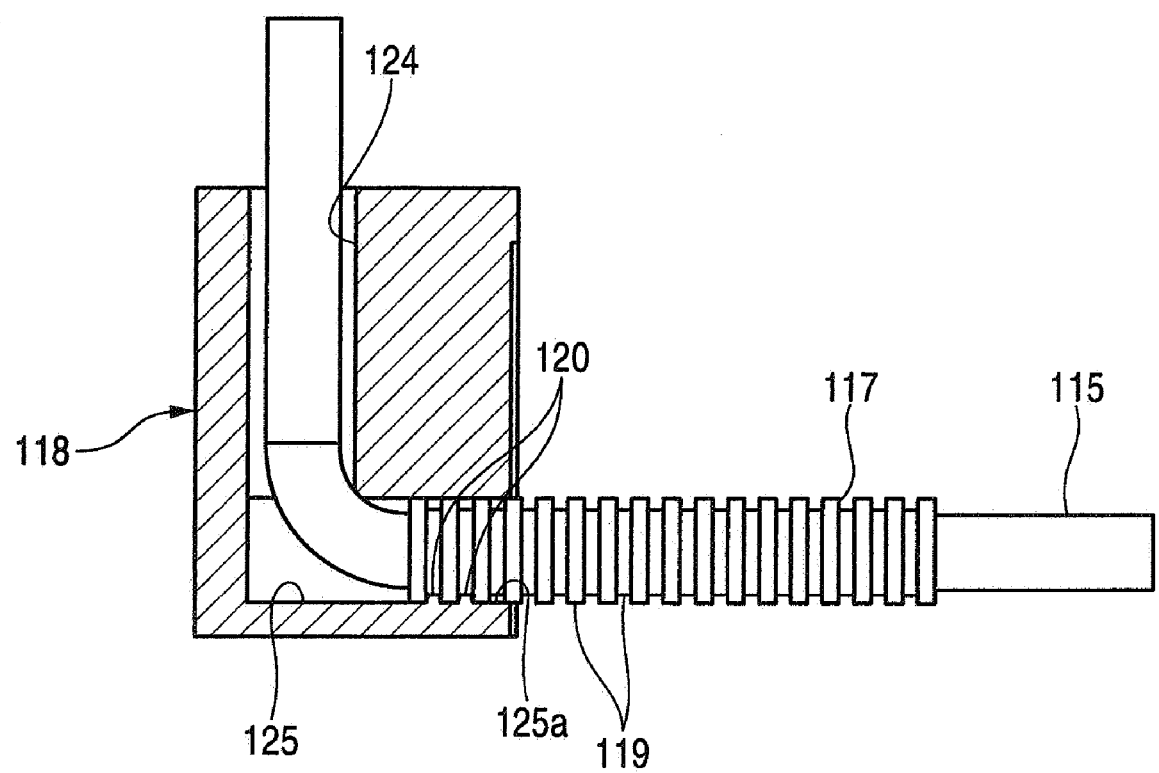
FIG. 12 is a cross-sectional view taken along line XII-XII of FIG. 11.

FIG. 10 is a perspective view of a vehicle sliding seat to which a wiring harness holding device of a first embodiment of the invention is applied, FIG. 11 is an exploded perspective view of a main part of the wiring harness holding device shown in FIG. 10, FIG. 12 is a perspective view showing an assembling process of the main part shown in FIG. 11, and FIG. 13 shows plan views of the vehicle sliding seat as viewed from a bottom side thereof which explain the operation of the wiring harness holding device shown in FIG. 10.

Firstly, a sliding construction of a vehicle sliding seat will be described.

As shown in FIG. 10, a pair of sliders 111 which extend in a back and forth or longitudinal direction of a vehicle body, not shown, are mounted on a bottom side of a vehicle sliding seat 110 in such a manner as to be spaced apart in a width direction of the seat 110, and front end portions of the individual sliders 111 are connected to each other by a connecting bar 112 which is extended between the pair of sliders 111.

In addition, a pair of guide rails 113 are provided to extend on a floor of the vehicle body in the longitudinal direction of the vehicle body in such a manner as to correspond to the pair of sliders 111, respectively. Each slider 111 travels along the corresponding guide rail 113, so as to allow the seat 110 to slide in the longitudinal direction of the vehicle body.

Additionally, a wiring harness 115 is laid out in such a manner as to extend between the vehicle body and the seat 110, and the wiring harness holding device of this embodiment includes a movable side holding portion 116 which holds the wiring harness 115 on the seat 110 and a stationary side holding portion which holds the wiring harness on the vehicle body.

The stationary side holding portion is made up of a floor-bound connector 114 mounted on an inside of a front end portion of one of the guide rails 113, and the wiring harness 115 is connected to the floor-bound connector 114 at one end thereof. In addition, the movable side holding portion 116 is mounted on the connecting bar 112 and holds one portion of the wiring harness 115.

As shown in FIGS. 11 and 12, the movable side holding portion 116 includes a corrugated tube 117 and a fixing member 118 which is fixed to the seat 110, both the corrugated tube 117 and the fixing member 118 being made from synthetic resin.

The fixing member 118 has provided therein a shaft hole 124 which extends in a vertical direction to thereby be made open to an upper surface of the fixing member 118 and an exit hole 125 which communicates with a lower end of the shaft hole 124. An opening 125a of the exit hole 125 is formed in such a manner as to open at a predetermined center angle (substantially 90° in the illustrated example) about an axis of the shaft hole 124 to form a fan-shaped opening.

The wiring harness 115 is passed through the shaft hole 124 and the exit hole 125 sequentially while being bent at a connecting portion between the shaft hole 124 and the exit hole 125 of the fixing member 118 and is then caused to exit from the fixing member 118 towards the floor-bound connector 114. The corrugated tube 117 is installed externally on the wiring harness which is caused to exit from the exit hole 125 over a predetermined length. The corrugated tube 117 has a proper rigidity and is adapted to reinforce the wiring harness 115 so that the wiring harness 115 doest not bend immediately after it is caused to exit from the exit hole 125.

The corrugated tube 117 has annular ridges and grooves 119 which are formed alternately on an outer surface along a longitudinal direction thereof and is installed into the opening 125a of the exit hole 125 at one end portion thereof. A guide member 120 is formed at a circumferential edge portion of the opening 125a of the exit hole 125 in such a manner as to fit in the ridges and grooves 119 lying at the one end portion of the corrugated tube 117 and to extend in an arc-like shape about the axis of the shaft hole 124. The corrugated tube 117 is guided by the guide member 120 so as to be supported at the opening 125a of the exit hole 125 in such a manner as to swivel about the axis of the shaft hole 124 and is restricted by the guide member 120 from being dislodged from the opening 125a of the exit hole 125.

The shaft hole 124 is formed larger in diameter than the wiring harness 115, whereby the wiring harness 115 is rotatably supported within the shaft hole 124. The wiring harness 115 which is caused to exit from the shaft hole 124 is strongly fixed to a support piece 126 which is provided at a position lying adjacent to an open edge portion of the shaft hole 124 in such a manner as to erect therefrom by, for example, being bundled by a bundling member such as an adhesive tape 130 or the like. Due to this, a twisting rotation is generated mainly in a portion of the wiring harness 115 which is accommodated within the shaft hole 124 in association with the swiveling of the wiring harness 115 which is caused to exit from the exit hole 125 together with the corrugated tube 117 about the axis of the shaft hole 124.

The movable side holding portion 116, which is configured as has been described above, is mounted on the connecting bar 112 by bringing a hook 131 provided on the fixing member 118 into engagement with a locking hole 132 (refer to FIG. 13) provided in the connecting bar 112. Note that as shown in FIG. 13, a plurality of locking holes 132 are provided at predetermined intervals in a longitudinal direction of the connecting bar 112, so that a spacing distance between the floor-bound connector 114 and the movable side holding portion 116 can be adjusted along the width direction of the seat 110 or a direction which intersects a sliding direction of the seat 110 at right angles (note that while in this embodiment, the direction is described as being the width direction of the seat 110 which is horizontal relative to the floor, the direction intersecting the sliding direction at right angles includes directions horizontal and vertical relative to the floor, as well as a resultant thereof) by bringing the hook 131 into engagement with a proper one of the locking holes 132.

Next, referring to FIG. 13, the operation of the wiring harness holding device, which has been described heretofore, will be described below.

FIGS. 13A to 13D show how the seat 110 slides forwards.

Figure 13A:
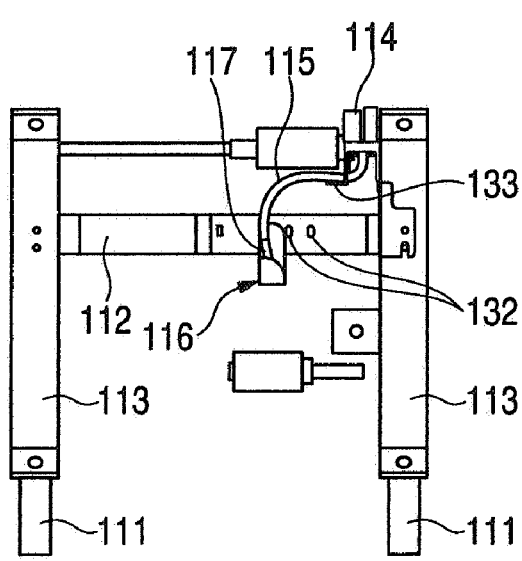
FIGS. 13A to 13D are plan views of the vehicle sliding seat as viewed from a bottom side thereof which explain the operation of the wiring harness holding device shown in FIG. 10.

In an initial state shown in FIG. 13A, the floor-bound connector 114 is situated in front of the movable side holding portion 116 while being spaced apart therefrom in the width direction of the seat 110. The corrugated tube 117 extends substantially forwards.

Figure 13B:
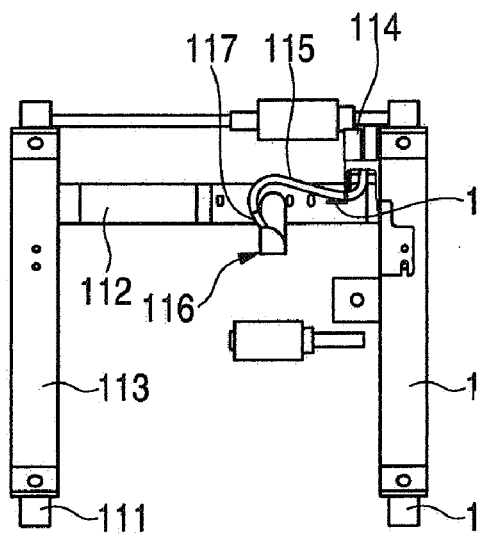

The floor-bound connector 114 and the movable side holding portion 116 approach each other when the seat 110 slides forwards from the state shown in FIG. 13A to a state shown in FIG. 13B. Due to this, an excess length is produced in the wiring harness 115, whereby the wiring harness 115 is bent. Due to the rigidity (the restoring force) of the wiring harness 115, however, a torque is applied to the corrugated tube 117, whereby the corrugated tube 117 swivels about the axis of the shaft hole 124. In addition, the wiring harness 115 swivels together with the corrugated tube 117, whereby the direction in which the wiring harness 115 is caused to exit from a distal end of the corrugated tube 117 changes about the axis of the shaft hole 124, the excess length of the wiring harness 115 being thereby absorbed.

Figure 13C:
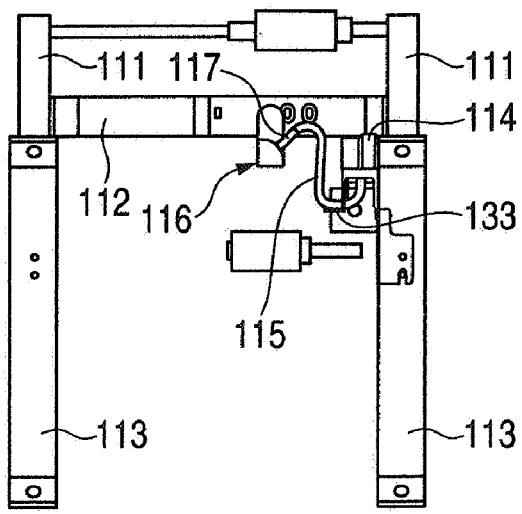
Figure 13D:
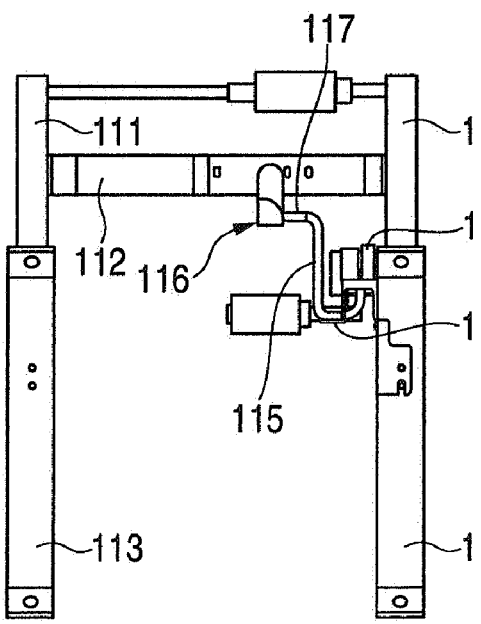
Figure 14A:
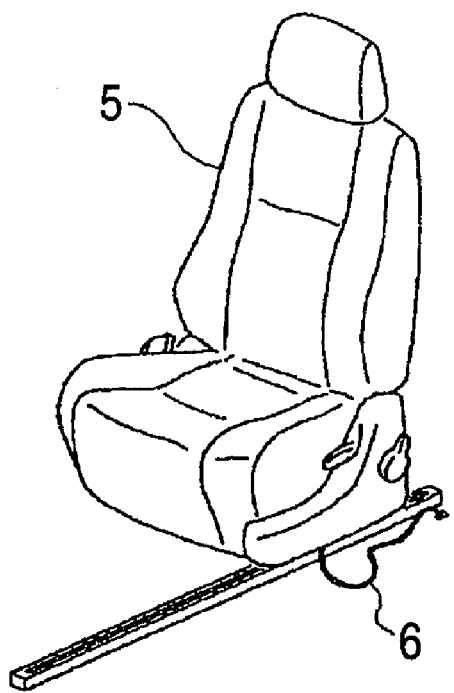
FIGS. 14A and 14B are perspective views which shows a state in which an excess length is produced in the wiring harness in association with the sliding of the sliding seat.
Figure 14B:
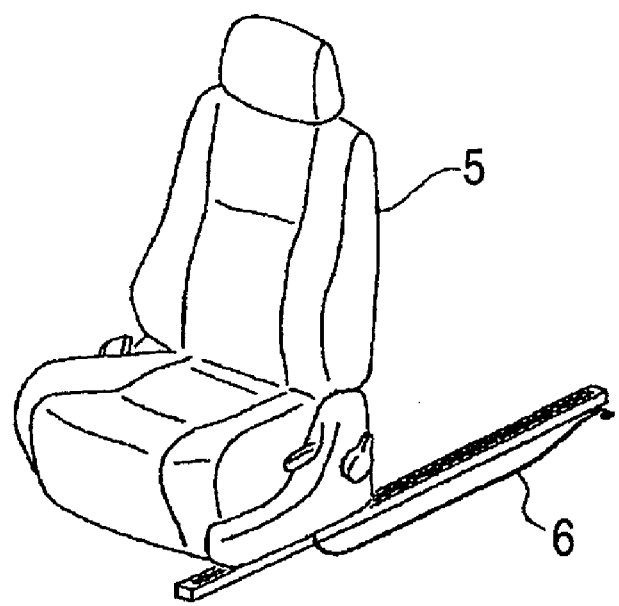
Figure 15:
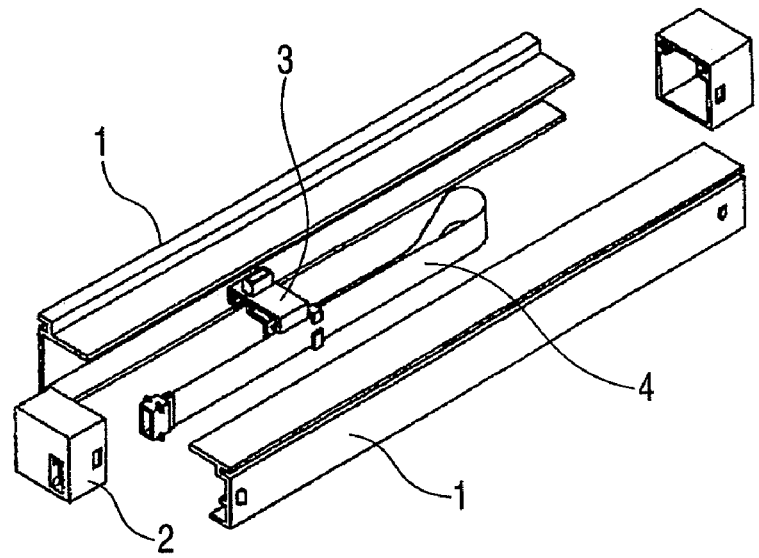
FIG. 15 is an exploded perspective view of a conventional wiring harness holding device.
Figure 16:
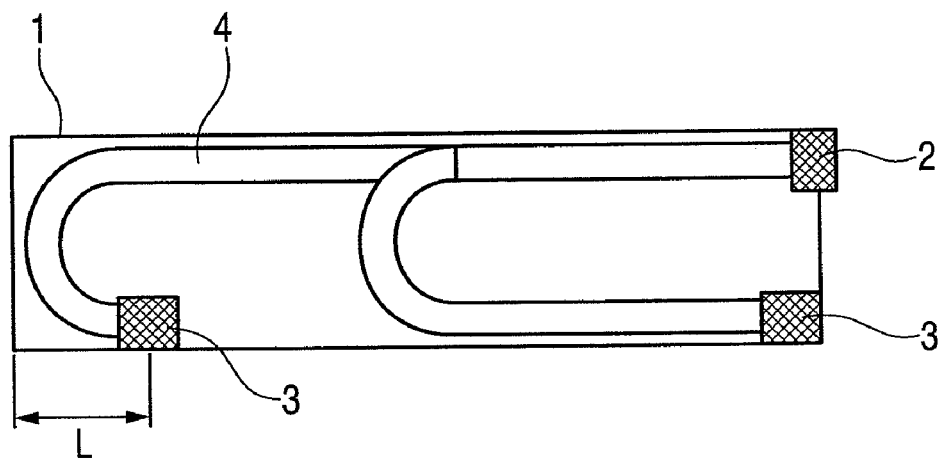
FIG. 16 is a plan view which explains the operation of the wiring harness holding device shown in FIG. 15.

Then, when the seat 110 slides forwards from the state shown in FIG. 13B to states shown in FIGS. 13C, 13D, the floor-bound connector 114 is spaced apart from the movable side holding portion 116. Then, being pulled by the wiring harness 115, the corrugated tube 117 swivels. Due to the corrugated tube 117 swiveling so that the distal end of the corrugated tube 117 is directed towards the floor-bound connector 114 in such a state that the wiring harness 115 is extended to its maximum length as shown in FIG. 13D, the movable side holding portion 116 and the floor-bound connector 114 can be linked together by the wiring harness 115, which is shorter than that used in the conventional example, whereby the reduction in size of the wiring harness holding device is realized.

Here, the twisting rotation is produced mainly in the portion of the wiring harness 115 which is accommodated in the shaft hole 124 as the wiring harness 115 swivels about the axis of the shaft hole 124 together with the corrugated tube 117, whereby the stress applied to the wiring harness 115 is relaxed.

Additionally, the wiring harness 115 is fixed to the vehicle body by a clamp 133 in such a manner as to follow along the width direction of the seat 110 in the vicinity of the floor-bound connector 114, whereby the behavior of the wiring harness 115 is stabilized and the generation of looseness is restricted.

Furthermore, the corrugated tube 117 and the fixing member 118 which configure the movable side holding portion 116 are both made from synthetic resin, providing for superior recycling properties.

Note that the invention is not limited to the individual embodiments but may be modified properly without departing from the spirit and scope of the invention.

The present application is based on Japan Patent Application No. 2005-168347 filed on Jun. 8, 2005, Japan Patent Application No. 2005-168346 filed on Jun. 8, 2005, and Japan Patent Application No. 2006-031401 filed on Feb. 8, 2006, the contents of which are incorporated herein for reference.

What is claimed is:

1. A wiring harness holding device for holding a wiring harness laid between a stationary structure and a movable structure slidably provided to the stationary structure, comprising;
   a movable side holding portion that holds one portion of the wiring harness on the movable structure; and
   a stationary side holding portion that holds another portion of the wiring harness on the stationary structure,
   wherein the movable side holding portion holds the wiring harness so that the wiring harness derived from the movable side holding portion towards the stationary side holding portion swivels around the movable side holding portion in association with the sliding movement of the movable structure,
   wherein the movable side holding portion includes:
      a protector which has a shaft portion and an arm portion extending in a direction intersecting an extending direction of the shaft portion, and which holds one end portion of the wiring harness; and
      a support member which is fixed to the movable structure and rotatably supports the shaft portion of the protector; and
      wherein the protector swivels so as to absorb an excess length of the wiring harness produced by the sliding movement of the movable structure; and
   further comprising a biasing member that biases the protector in a predetermined rotational direction.

2. The wiring harness holding device as set forth in claim 1, wherein the wiring harness derived from the shaft portion of the protector is fixed to the support member.

3. The wiring harness holding device as set forth in claim 1, further comprising a restricting member that restricts a rotational angle of the shaft portion of the protector.

4. The wiring harness holding device as set forth in claim 3, wherein the restricting member has ribs which are provided on the protector and the support member respectively so as to engage with each other.

5. The wiring harness holding device as set forth in claim 1, further comprising a clamp that fixes the wiring harness to the stationary structure so that the wiring harness extends a direction perpendicular to the slide moving direction of the movable structure in the vicinity of the stationary side holding portion.

6. The wiring harness holding device as set forth in claim 1, wherein the movable side holding portion is disposed so as to be spaced apart from the stationary side holding portion in a direction perpendicular to the slide moving direction of the movable structure.

7. The wiring harness holding device as set forth in claim 1, wherein the movable side holding portion rotatably supports the wiring harness.

8. The wiring harness holding device as set forth in claim 7, wherein the movable side holding portion includes:
 a fixing member which is fixed to the movable structure and which has a shaft hole and an exit hole communicating with the shaft hole, the exit hole having an opening part opening around an axis of the shaft hole by a predetermined degree; and
 a reinforcement member which holds the wiring harness which is passed through the shaft hole and the exit hole in the fixing member and is derived from the fixing member; and
 wherein the reinforcement member is supported at the opening portion of the exit hole so as to swivel about the axis of the shaft hole.

9. The wiring harness holding device as set forth in claim 8, wherein the reinforcement member is a corrugated tube having annular ridges and grooves alternately on an outer surface along a longitudinal direction thereof; and
 wherein a guide rail is formed at the opening portion of the exit hole and extends into an arc-like shape so as to engage with the ridges and grooves of the corrugated tube and to swivel about the axis of the shaft hole.

10. The wiring harness holding device as set forth in claim 8, further comprising a clamp that fixes the wiring harness to the stationary structure so that the wiring harness extends a direction perpendicular to the slide moving direction of the movable structure in the vicinity of the stationary side holding portion.

11. The wiring harness holding device as set forth in claim 8, wherein the movable side holding portion is disposed so as to be spaced apart from the stationary side holding portion in a direction perpendicular to the slide moving direction of the movable structure.

12. A wiring harness holding device for holding a wiring harness laid between a stationary structure and a movable structure slidably provided to the stationary structure, comprising;
 a movable side holding portion that holds one portion of the wiring harness on the movable structure; and
 a stationary side holding portion that holds another portion of the wiring harness on the stationary structure,
 wherein the movable side holding portion holds the wiring harness so that the wiring harness derived from the movable side holding portion towards the stationary side holding portion swivels around the movable side holding portion in association with the sliding movement of the movable structure,
 wherein the movable side holding portion includes:
  a protector which has a shaft portion and an arm portion extending in a direction intersecting an extending direction of the shaft portion, and which holds one end portion of the wiring harness; and
  a support member which is fixed to the movable structure and rotatably supports the shaft portion of the protector; and
 wherein the protector swivels so as to absorb an excess length of the wiring harness produced by the sliding movement of the movable structure,
 wherein the wiring harness includes a main wiring harness and a sub-wiring harness;
 wherein the protector includes a main protector adapted to hold the main wiring harness and a sub-protector adapted to hold the sub-wiring harness;
 wherein the shaft portion and the arm portion are respectively divided into two parts which are provided on the main protector and the sub-protector respectively;
 wherein the shaft portion of the main protector is rotatably supported on the support member; and
 wherein the sub-protector is assembled to the main protector while the shaft portion of the sub-protector is inserted into a shaft hole in the support member which rotatably supports the shaft portion of the main protector.

13. A wiring harness holding device for holding a wiring harness laid between a stationary structure and a movable structure slidably provided to the stationary structure, comprising;
 a movable side holding portion that holds one portion of the wiring harness on the movable structure; and
 a stationary side holding portion that holds another portion of the wiring harness on the stationary structure,
 wherein the movable side holding portion holds the wiring harness so that the wiring harness derived from the movable side holding portion towards the stationary side holding portion swivels around the movable side holding portion in association with the sliding movement of the movable structure,
 wherein the movable side holding portion rotatably supports the wiring harness,
 wherein the movable side holding portion includes:
  a fixing member which is fixed to the movable structure and which has a shaft hole and an exit hole communicating with the shaft hole, the exit hole having an opening part opening around an axis of the shaft hole by a predetermined degree;
  a reinforcement member which holds the wiring harness which is passed through the shaft hole and the exit hole in the fixing member and is derived from the fixing member; and
 wherein the reinforcement member is supported at the opening portion of the exit hole so as to swivel about the axis of the shaft hole; and
 wherein the fixing member has a support part to which the wiring harness derived from the shaft hole in the fixing member is fixed.

14. The wiring harness holding device as set forth in claim 13, wherein the movable side holding portion is disposed so as to be spaced apart from the stationary side holding portion in a direction perpendicular to the slide moving direction of the movable structure.

15. The wiring harness holding device as set forth in claim 13, wherein the reinforcement member is a corrugated tube having annular ridges and grooves alternately on an outer surface along a longitudinal direction thereof; and
 wherein a guide rail is formed at the opening portion of the exit hole and extends into an arc-like shape so as to engage with the ridges and grooves of the corrugated tube and to swivel about the axis of the shaft hole.

16. A wiring harness holding device for holding a wiring harness laid between a stationary structure and a movable structure slidably provided to the stationary structure, comprising;
 a movable side holding portion that holds one portion of the wiring harness on the movable structure; and
 a stationary side holding portion that holds another portion of the wiring harness on the stationary structure, wherein the movable side holding portion holds the wiring harness so that the wiring harness derived from the movable side holding portion towards the stationary side holding portion swivels around the movable side holding portion in association with the sliding movement of the movable structure;

wherein the movable side holding portion includes;

a protector which has a shaft portion and an arm portion extending in a direction intersecting an extending direction of the shaft portion, and which holds one end portion of the wiring harness; and a support member which is fixed to the movable structure and rotatably supports the shaft portion of the protector;

wherein the protector swivels so as to absorb an excess length of the wiring harness produced by the sliding movement of the movable structure;

wherein the wiring harness is passed through the supporting member; and wherein the whole of the supporting member and the movable structure integrally slides in a sliding movement direction of the movable structure.

17. A wiring harness holding device for holding a wiring harness laid between a stationary structure and a movable structure slidably provided to the stationary structure, comprising:

a movable side holding portion that holds one portion of the wiring harness on the movable structure; and a stationary side holding portion that holds another portion of the wiring harness on the stationary structure, wherein the movable side holding portion holds the wiring harness so that the wiring harness derived from the movable side holding portion towards the stationary side holding portion swivels around the movable side holding portion in association with the sliding movement of the movable structure;

wherein the movable side holding portion rotatably supports the wiring harness;

wherein the movable side holding portion includes:

a fixing member which is fixed to the movable structure and which has a shaft hole and an exit hole communicating with the shaft hole, the exit hole having an opening part opening around an axis of the shaft hole by a predetermined degree; and a reinforcement member which holds the wiring harness which is passed through the shaft hole and the exit hole in the fixing member and is derived from the fixing member; and wherein the reinforcement member is supported at the opening portion of the exit hole so as to swivel about the axis of the shaft hole;

wherein the wiring harness is passed through the fixing member; and wherein the whole of the fixing member and the movable structure integrally slides in a sliding movement direction of the movable structure.

* * * * *